UNITED STATES PATENT OFFICE.

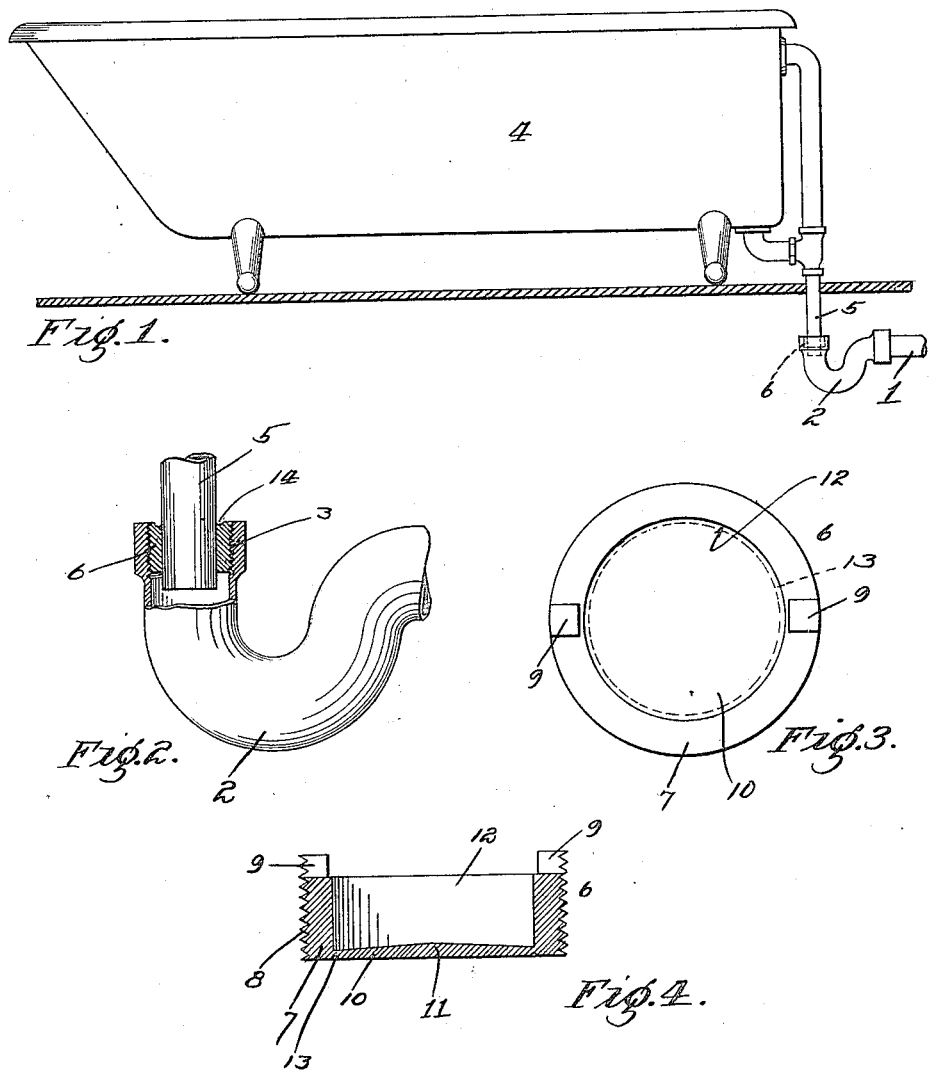

FREDERICK W. DELANOY AND FRED NELSON DELANOY, OF ALAMEDA, CALIFORNIA.

PLUMBER'S FITTING.

1,213,466. Specification of Letters Patent. Patented Jan. 23, 1917.

Application filed April 19, 1916. Serial No. 92,309.

*To all whom it may concern:*

Be it known that we, FREDERICK W. DELANOY and FRED NELSON DELANOY, citizens of the United States, residing at Alameda, in the county of Alameda and State of California, have invented certain new and useful Improvements in Plumbers' Fittings, of which the following is a specification.

This invention relates to improvements in plumbers' fittings and more particularly to a plug that is adapted to be screwed into the rough piping to seal the same while the pressure test is being applied, but which fitting will permit the easy placing of the connecting pipe after the test has been applied.

Another object of our invention is to so arrange the fitting that a portion thereof may be broken out after the pressure test is applied without injury to the remaining portion.

Still another object is to provide a collar by which the connecting fitting may be calked, thereby producing a tight joint.

With these and other objects in view the invention consists in the novel construction, combination and arrangement of parts herein illustrated and more specifically pointed out in the appended claims.

Reference being had to accompanying drawings forming a part of this specification, Figure 1 is a view in elevation showing the manner in which our improved fitting is applied in connecting a bath tub to the draining system. Fig. 2 is an enlarged view in elevation with a portion in section, showing our improved fitting in position within the drainage pipe. Fig. 3 is an enlarged view in plan of the fitting itself. Fig. 4 is an enlarged view in section showing the same before the center portion is broken away to admit the connecting pipe.

Referring to corresponding parts in the several views by the same numerals of reference, 1 denotes the drainage pipe having the trap 2, which trap is threaded as shown at 3. The fixture to be drained is denoted by 4, in this case a bath tub, and from which extends a pipe 5, into the trap 2. Our improved cap and bushing denoted in general by 6 consists of the annular ring 7 threaded on the outside as shown at 8 to correspond with threads 3. This portion is also provided with two or more lugs 9 by which it may be screwed into position. On the side of ring opposite the lugs, a plate 10 extends across the face of the ring, this plate being reinforced toward the center as shown at 11. While we have shown this plate as being formed continuously with the ring, the same may be formed of a separate piece and pressed into position. The entire fitting is formed of a soft metal such as lead or some alloy and the junctions between the plate 10 and the ring 7 is made the weakest portion even to the extent of providing an annular groove 13 so that the plate may be readily broken away from the ring.

In use the bushing is screwed into the upper end of the trap, or other portion of the rough plumbing to which a waste pipe is to be connected, and is allowed to remain in this position until after the pressure test is applied to the rough plumbing to ascertain if the same is tight. When the waste is to be connected the plate 10 is broken away leaving the ring in position, the inside diameter of this ring being but slightly larger than the outside diameter of the waste pipe 5. The latter is then inserted through opening 12 and the ring calked about the waste pipe as shown at 14 forming a water and gas-tight joint.

It will thus be seen that we have provided a fitting which is readily installed, which allows a static test to be applied to the rough piping and at the same time allows the connecting pipe to be quickly installed after the test. At the same time this fitting serves to form a tight joint between the waste and rough piping, making a device which is cheap in cost and effective in reducing the installation cost.

While we have shown the preferred construction of our invention it will be understood that minor changes in detail and form may be resorted to without departing from the scope of the claims.

We claim as new and wish to cover by Letters Patent:

1. A fitting comprising a ring of soft metal, external threads formed on said ring and a plate extending across the face of said ring to form a detachable closure therefor.

2. A fitting comprising a ring of soft metal, external threads formed on said ring, a plate forming a closure for said ring, said plate being detachably secured to the face of said ring, and reinforced toward its center.

3. A fitting comprising a ring of soft metal, external threads formed on said ring and an integrally formed plate extending across one end of said ring to form a detachable closure therefor.

4. A fitting comprising a ring of soft metal, external threads formed on said ring, an integrally formed plate extending across one end of said ring to form a detachable closure therefor, and axially formed lugs extending from one end of said ring for screwing said fitting into position.

In testimony whereof we affix our signatures.

FREDERICK W. DELANOY.
FRED NELSON DELANOY.